US008881618B2

(12) United States Patent
Buzzard et al.

(10) Patent No.: US 8,881,618 B2
(45) Date of Patent: Nov. 11, 2014

(54) ADJUSTABLE STEERING COLUMN LOCK (71) Applicant: Steering Solutions IP Holding Corporation, Saginaw, MI (US)

(72) Inventors: Donald A. Buzzard, Saginaw, MI (US); Michael P. Anspaugh, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 219 days.

(21) Appl. No.: 13/644,755

(22) Filed: Oct. 4, 2012

(65) Prior Publication Data

US 2014/0096638 A1 Apr. 10, 2014

(51) Int. Cl.
*B62D 1/18* (2006.01)

(52) U.S. Cl.
USPC .............. 74/493; 74/494; 74/495; 280/775; 280/777; 280/779

(58) Field of Classification Search
USPC ............ 74/492, 493, 494, 495; 280/775, 777, 280/779
See application file for complete search history.

(56) References Cited

U.S. PATENT DOCUMENTS

| 5,722,299 | A   | * | 3/1998  | Yamamoto et al. | ............. 74/493 |
| 5,893,676 | A   | * | 4/1999  | Yamamoto et al. | ........... 403/325 |
| 7,533,594 | B2  | * | 5/2009  | Menjak et al.   | .................. 74/493 |
| 7,677,133 | B2  | * | 3/2010  | Matsui et al.   | ................... 74/493 |
| 2003/0057694 | A1 | * | 3/2003 | Manwaring et al. | .......... 280/775 |
| 2008/0143092 | A1 | * | 6/2008 | Menjak et al.   | ................ 280/775 |
| 2008/0245176 | A1 | * | 10/2008 | Manwaring et al. | ............ 74/493 |
| 2010/0300238 | A1 | * | 12/2010 | Ridgway et al.  | ................ 74/493 |
| 2010/0301593 | A1 | * | 12/2010 | Sakata          | .......... 280/775 |
| 2011/0041642 | A1 | * | 2/2011  | Havlicek        | ......... 74/493 |
| 2013/0160596 | A1 | * | 6/2013  | Tanaka          | ............ 74/493 |

* cited by examiner

*Primary Examiner* — Toan To
(74) *Attorney, Agent, or Firm* — Cantor Colburn LLP (57) ABSTRACT

A lock for an adjustable steering column includes a rotatable locking lever to actuate the lock between an unlocked position and locked position, a lock plate including plate lock teeth and a first slot, and a slider including slider lock teeth and a second slot angled relative to the first slot. The slider teeth are received between respective plate lock teeth. A lock bolt rotates with the locking lever and extends through the first and second slots, and has a retainer on one end. A cam positioned on the lock bolt applies or releases a force to the slider in response to rotation of the locking lever to actuate the lock. In the locked position the slider lock teeth lockingly engage between the plate lock teeth, and in the unlocked position, the slider lock teeth are released from locking engagement with and are positioned between the plate lock teeth.

20 Claims, 7 Drawing Sheets

ADJUSTABLE STEERING COLUMN LOCK

BACKGROUND OF THE INVENTION

The following description relates to a lock for an adjustable steering column, and in particular, a rake and/or telescope lock in an adjustable steering column.

Steering columns in vehicles may be adjustable in a rake direction and a telescope direction. The adjustable steering column may be unlocked in order to be adjusted to a desired position. Once the desired position is reached, the steering column may be locked in place to resist movement from the desired position.

A traditional adjustable steering column may include a column jacket, a compression bracket fixed to and movable with the column jacket and a mounting bracket fixed to the vehicle. The column jacket and compression bracket are movable relative to the mounting bracket. The adjustable steering column may further include a locking lever, a rake lock and a telescope lock.

The locking lever is rotatable between a locked position where adjustment of the steering column is resisted and an unlocked position where adjustment of the steering column is permitted. The locking lever rotates a lock bolt that extends through the mounting bracket and compression bracket. Rotation of the lock bolt may actuate the rake lock and telescope lock between respective locked and unlocked positions.

The rake lock typically includes a rake lock body and a rake slot formed in one of the compression bracket or mounting bracket. The rake lock body includes a plurality of rake lock teeth formed thereon and the rake slot includes a corresponding plurality of rake slot teeth. In the unlocked position the rake lock teeth are disengaged from the rake slot teeth with a clearance between peaks of the rake lock teeth and peaks of the rake slot teeth. In this position, the steering column may be adjusted in the rake direction. When a desired position of the steering column is reached, the locking lever may be rotated from the unlocked position to the locked position. During rotation of the locking lever from the unlocked position to the locked position, the rake lock body moves toward the rake slot such that the rake lock teeth move toward engagement with the rake slot teeth. In the locked position, the rake lock teeth and the rake slot teeth are engaged such that adjustment of the steering column in the rake direction is resisted.

The telescope lock may include a telescope lock body and a telescope slot formed in one of the compression bracket or mounting bracket. The telescope lock body includes a plurality of telescope lock teeth and the telescope slot includes a corresponding plurality of telescope slot teeth. Similar to the rake lock arrangement described above, the telescope lock teeth and disengaged and separated from the telescope slot teeth when in the unlocked position. Accordingly, the steering column may be adjusted in the telescope direction with the telescope lock in the unlocked position. Rotation of the locking lever toward the locked position moves the telescope lock body with the telescope lock teeth toward engagement with the telescope slot teeth. In the locked position, the telescope lock teeth and the telescope slot teeth are engaged such that adjustment of the steering column in the telescope direction is limited.

One drawback to the arrangement above is that when the locking lever is rotated from an unlocked position to a locked position, peak areas of the lock teeth on the rake body and/or telescope body may come into contact with peak areas of the lock teeth within the respective rake and/or telescope slot. The peak-to-peak contact between the respective teeth prevents the rake and telescope locks from becoming engaged. Thus, adjustment in the rake and/or telescope direction is not resisted, even with the locking lever in a locked position. That is, peak-to-peak contact between the lock teeth of the rake lock body and/or telescope lock body and the lock teeth of the respective rake slot and/or telescope slot prevent the lock teeth of the rake body and/or telescope body from engaging between the lock teeth of the respective rake slot and/or telescope slot. Further, there are only a finite number of adjustment positions available in the rake and telescope directions, limited by the number of corresponding lock teeth between the rake body and telescope body and the respective slots.

In another typical adjustable steering column, in a locked condition, a force may be applied to a plurality of friction plates, which in turn apply a compressive force to at least one of the mounting bracket, compression bracket and column jacket. The force may be applied from a cam mechanism connected to a rotatable locking lever that is configured to apply an axial compressive force in response to rotation of the locking lever in one direction. The compressive force applied to the column jacket acts to hold the adjustable steering column against adjustment.

The steering column may be unlocked by rotating the locking lever in an opposite direction. Rotation of the locking lever in the opposite direction causes the cam to release the axial compressive force from the friction plates. Accordingly, the compressive force is released from the column jacket and the steering column may be adjusted. Drawbacks to the friction plate configuration include complexity of design and the associated costs.

Accordingly, it is desirable to provide an adjustable steering column lock which may ensure engagement between oppositely positioned locking teeth.

SUMMARY OF THE INVENTION

According to an exemplary embodiment of the present invention, there is provided a lock for an adjustable steering column configured to lock the adjustable steering column against adjustment in a rake or telescope direction. The lock includes a rotatable locking lever configured to actuate the lock between an unlocked position and locked position, a lock plate configured to be secured to the adjustable steering column and including a plurality of plate lock teeth extending in a sliding direction and a first slot extending along a first axis, and a slider including a plurality of slider lock teeth extending in the sliding direction, the slider teeth configured to be received between respective plate lock teeth, and a second slot extending along a second axis, the second axis angled relative to the first axis. The lock further includes a lock bolt, rotatable with the locking lever, extending through the first slot and second slot, the lock bolt having a retaining mechanism fastened on one end thereof, and a cam positioned on the lock bolt configured to apply or release a compressive force to the slider in response to rotation of the locking lever, such that in the locked position the compressive force is applied to the slider and the slider lock teeth lockingly engage between the plate lock teeth thereby securing the slider against movement in the sliding direction relative to the lock plate, and in the unlocked position, the compressive force is released from the slider and the slider lock teeth are released from locking engagement with and positioned between the plate lock teeth thereby allowing the slider to move relative to the lock plate in the sliding direction.

According to another exemplary embodiment of the present invention, an adjustable steering column assembly for a vehicle includes a steering shaft extending along a first axis, a column jacket surrounding the steering a shaft, a compression bracket fixed to the column jacket, the compression bracket including a first side flange and a second side flange connected by a body portion and positioned on opposite side of the column jacket, each of the first side flange and second side flange having a first slot formed therein, and a mounting bracket secured to an adjacent portion of the vehicle, the mounting bracket including a first wall positioned adjacent to the first side flange and a second wall positioned adjacent to the second side flange, each of the first wall and second wall including a second slot formed therein. The assembly also includes a lock actuatable between a locked position where adjustment of the steering column is prevented and an unlocked position where adjustment of the steering column is allowed. The lock includes a rotatable locking lever configured to actuate the lock between an unlocked position and locked position, a lock plate secured to one of the compression bracket and mounting bracket, the lock plate having a plurality of plate lock teeth extending in a sliding direction and a plate slot extending along a second axis and a slider having a plurality of slider lock teeth extending in the sliding direction, the slider lock teeth configured to be received between respective plate lock teeth, and a slider slot extending along a third axis, the third axis angled relative to the second axis. The lock further includes a lock bolt, rotatable with the locking lever, extending through the plate slot, slider slot, second slot in the first and second walls, and first slot in the first and second side flanges, the lock bolt including a retaining mechanism positioned on one end thereof, and a cam positioned on the lock bolt configured to apply or release a compressive force to the slider in response to rotation of the locking lever, such that in the locked position the compressive force is applied to the slider and the slider lock teeth are lockingly engaged between the plate lock teeth thereby securing the slider against movement in the sliding direction relative to the lock plate, and in the unlocked position, the compressive force is released from the slider and the slider lock teeth are released from locking engagement with and positioned between the plate lock teeth thereby allowing the slider to move relative to the lock plate in the sliding direction.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
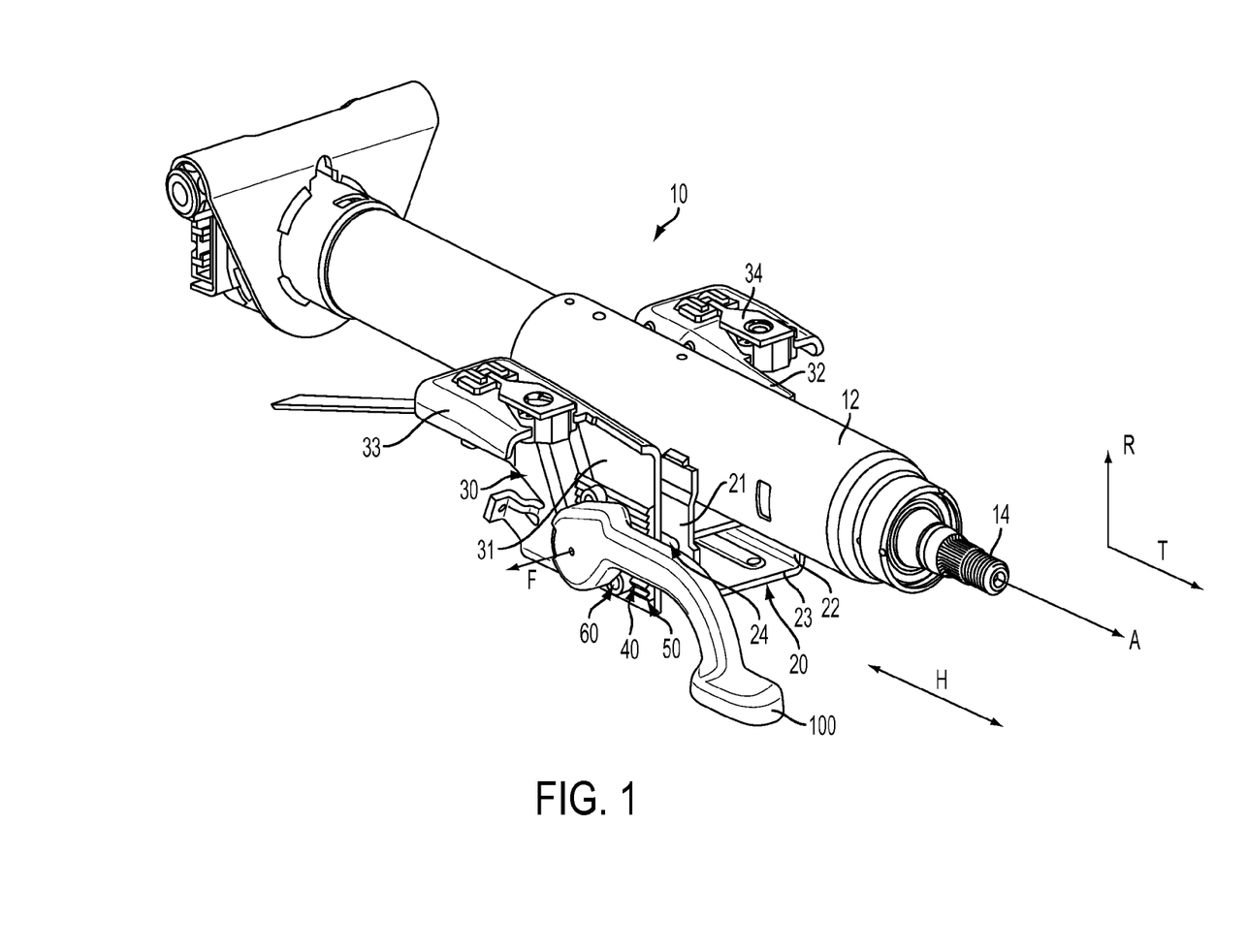
FIG. 1 is a perspective view of an adjustable steering column with a lock according to an exemplary embodiment of the present invention.

Referring now to the Figures, where the invention will be described with reference to specific embodiments, without limiting same, FIG. 1 shows an adjustable steering column of a vehicle in accordance with an exemplary embodiment of the present invention.

Figure 7:
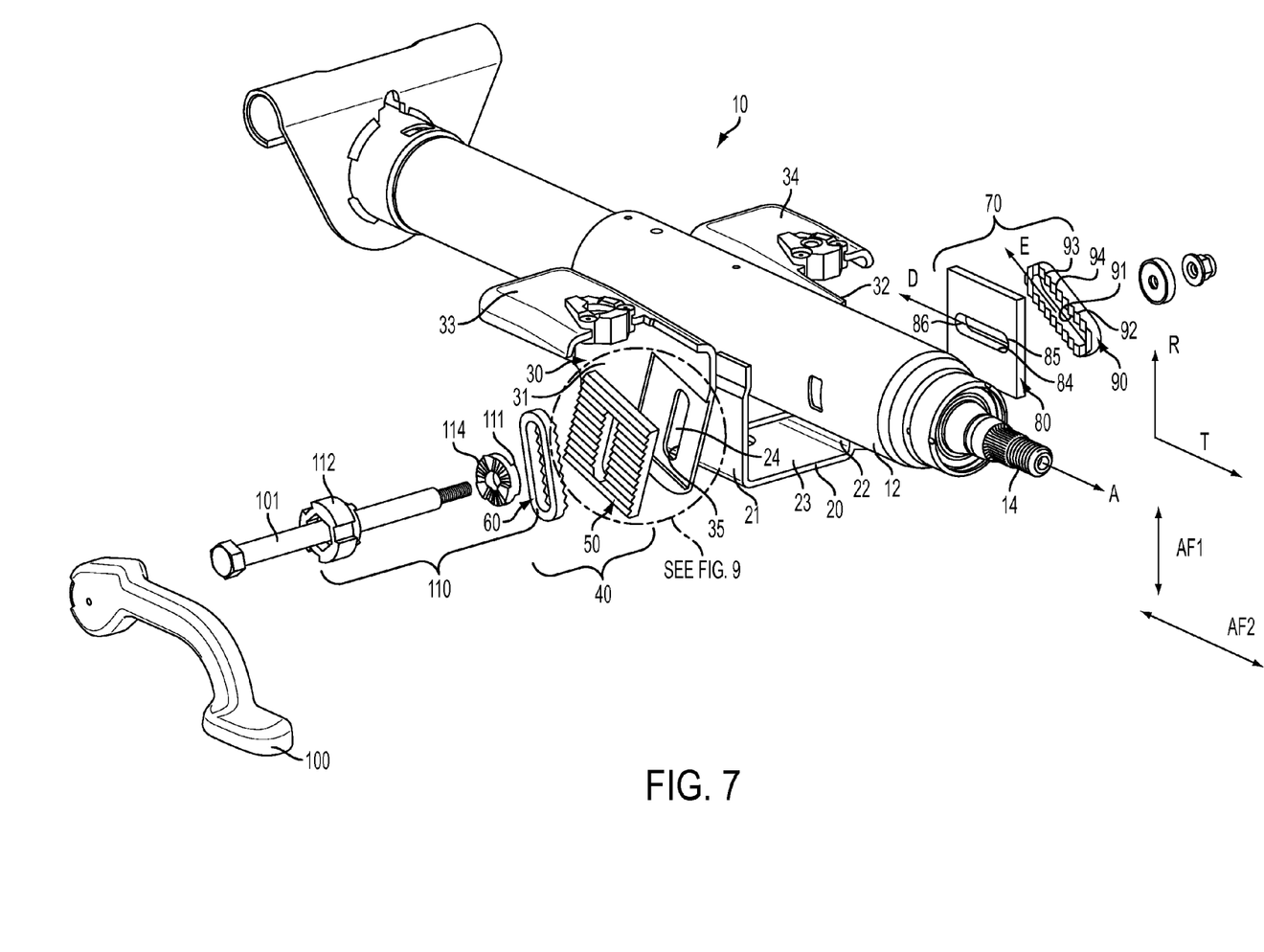
FIG. 7 is an exploded view of an adjustable steering column with a lock according to an exemplary embodiment of the present invention.

With reference to FIGS. 1 and 7, the adjustable steering column 10 includes a column jacket 12 housing a steering shaft 14 extending along a first axis 'A', a compression bracket 20 and a mounting bracket 30. The steering shaft 14 is connected to a steering wheel (not shown) at a first end and steering components (not shown) at a second end. The steering shaft 14 is configured to transfer rotation of the steering wheel by an operator of the vehicle to the steering components. The steering shaft 14 may be adjustable in a rake direction 'R' and/or a telescope direction 'T'.

The compression bracket 20 is fixed to the column jacket 12 and is movable with the column jacket during adjustment of the steering column 10. The compression bracket 20 may be formed generally in a "U" shape and include a first side flange 21, a second side flange 22, and a body portion 23 extending between the first and second side flanges 21, 22. The column jacket 12 is configured to be received between the first and second side flanges 21, 22 of the compression bracket 20.

The compression bracket 20 includes a first slot 24 formed in each of the first and second side flanges 21, 22. The first slot 24 is configured to receive a lock bolt (described further below) and may optionally be elongated to accommodate adjustment of the steering shaft 14 in a telescope direction 'T'.

The mounting bracket 30 is fixed to an adjacent portion of the vehicle and includes a first wall 31 and a second wall 32. A first mounting flange 33 and a second mounting flange 34 extend from first wall 31 and second wall 32, respectively. The first and a second mounting flanges 33, 34 are configured to receive at least one fastener for securing the mounting flange 30 to the adjacent portion of the vehicle.

In an exemplary embodiment, the mounting bracket 30 includes a second slot 35 positioned in each of the first wall 31 and second wall 32 (FIG. 7). The second slot 35 accommodates adjustment of the steering shaft 14 in the rake direction 'R' as described further below.

Figure 2:
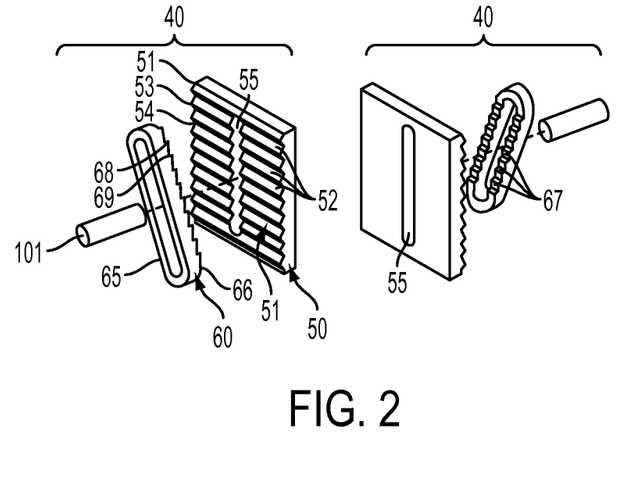
FIG. 2 is an exploded view of a lock for an adjustable steering column according to an exemplary embodiment of the present invention.

The adjustable steering column 10 also includes a lock to lock the steering column against adjustment. In an exemplary embodiment, the steering column includes a rake lock 40. With reference to FIG. 2, the rake lock 40 may include two rake locks 40 positioned on opposite sides of the adjustable steering column 10. However, it is understood that the present invention is not limited to such a configuration, and the rake lock 40 may be, for example, a single rake lock 40 positioned at one side of the adjustable steering column 10.

With reference to FIGS. 2-5, the rake lock 40 includes a rake lock plate 50 and a rake slider 60. In an exemplary embodiment, the rake lock plate 50 is secured to one of the first wall 31 and second wall 32 of the mounting bracket 30. The rake lock plate 50 includes locking face 51. A plurality of rake lock teeth 52 are positioned on, and extend across the locking face 51 of the rake lock plate 50 in a first sliding direction 'S1'.

Figure 4:
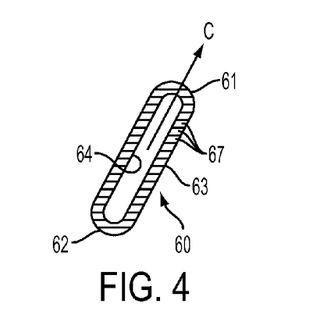
FIG. 4 is a plan view of a component of a lock for an adjustable steering column according to an exemplary embodiment of the present invention.
Figure 5:
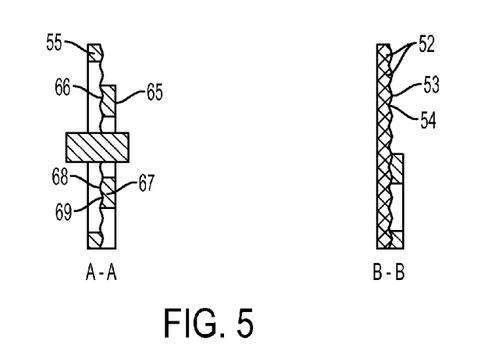
FIG. 5 includes cross section views of the lock for an adjustable steering column of FIG. 3 taken at A-A and B-B according to an exemplary embodiment of the present invention.

In an exemplary embodiment, the rake lock teeth 52 are formed as a plurality of peaks 53 having a plurality of valleys 54 formed therebetween. With reference to FIGS. 4 and 5, the rake lock teeth 52 may be generally triangular in cross section. However, it is understood that the rake lock teeth 52 of the present invention are not limited to a triangular cross-sectional shape and that other suitable cross-sectional shapes are envisioned.

Figure 3:
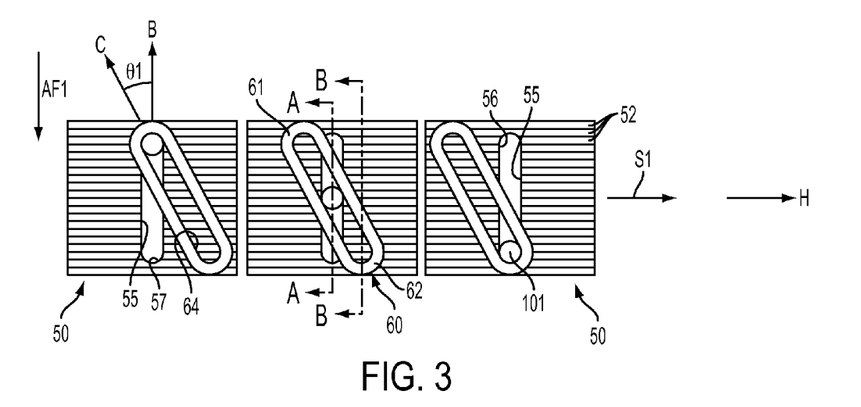
FIG. 3 is a plan view of a lock for an adjustable steering column in different positions during operation according to an exemplary embodiment of the present invention.

FIG. 3 shows an exemplary embodiment of the rake lock plate and rake slider in various positions during operation. As shown in FIG. 3, the rake lock plate 50 includes a rake slot 55 extending along a second axis 'B'. The rake slot 55 also extends through a thickness the rake lock plate 50 in a direction generally orthogonal to axis 'B'. The rake slot 55 includes a first end 56 and a second end 57. In an exemplary embodiment, the first end 56 and the second end 57 may define upper and lower limits for adjustment of the steering column 10 in the rake direction 'R'.

The rake slider 60 is selectively and reciprocally movable relative to the rake lock plate 50 in the first sliding direction 'S1'. With further reference to FIGS. 2-4, in an exemplary embodiment the rake slider 60 may be generally oblong in shape and include a first end 61, a second end 62 and central section 63. The first end 61 and second end 62 may each be rounded such that they present a generally circular profile at each end of the rake slider 60. The central section 63 may extend in a generally straight manner along a third axis 'C' between the first end 61 and the second end 62. A rake slider slot 64 is formed in the rake slider 60 and extends generally along the third axis 'C'.

With reference to FIGS. 2 and 5, the rake slider 60 further includes a first side 65 and a second side 66. In an exemplary embodiment, the first side 65 faces away from the rake lock plate 50 and the second side 66 faces the rake lock plate 50. The second side 66 includes a plurality of rake slider teeth 67 configured to project into the valleys 54 between the peaks 53 of the rake lock teeth 52, such that the rake slider teeth 67 lockingly engage the rake lock teeth 52 of the rake lock plate 50. Thus, the rake slider teeth 67 also extend in the first sliding direction 'S1'.

With reference to FIG. 3, the rake slider 60 is configured to be positioned relative to the rake lock plate 50 such that the third axis 'C' of the rake slider 60 is angled relative to the second axis 'B' of the rake slot 55 at a non-zero first angle θ1. In an exemplary embodiment, the first angle θ1 may be in the range of 30° to 50°. It is understood, however, that θ1 may be any non-zero angle. Accordingly, the rake slider teeth 67 of the rake slider 60, which extend in the first sliding direction 'S1', may extend at an angle relative to the third axis 'C'.

In an exemplary embodiment, and with reference to the cross-sections shown in FIG. 5, the rake slider teeth 67 are generally triangular in cross section. The rake slider teeth 67 may include a plurality of peaks 68 having a plurality of valleys 69 formed therebetween. However, the rake slider teeth 67 may be shaped differently than the rake lock teeth 52 of the rake lock plate 50. For example, the rake slider teeth 67 may extend outwardly from the second side 66 of the rake slider 60 at a different angle than the rake lock teeth 52 extend outwardly from the locking face 51 of the rake lock plate 50, or have different shapes or dimensions than the rake lock teeth 52. Accordingly, the rake slider teeth 67 may be shaped and configured to bite into the rake lock teeth 52 when the rake slider 60 is pressed into engagement with the rake lock plate 50 as further described below. It is understood that the present invention is not limited to the cross-sectional shape described above and that other suitable cross-sectional shapes of the rake slider teeth 67 are envisioned.

Figure 6:
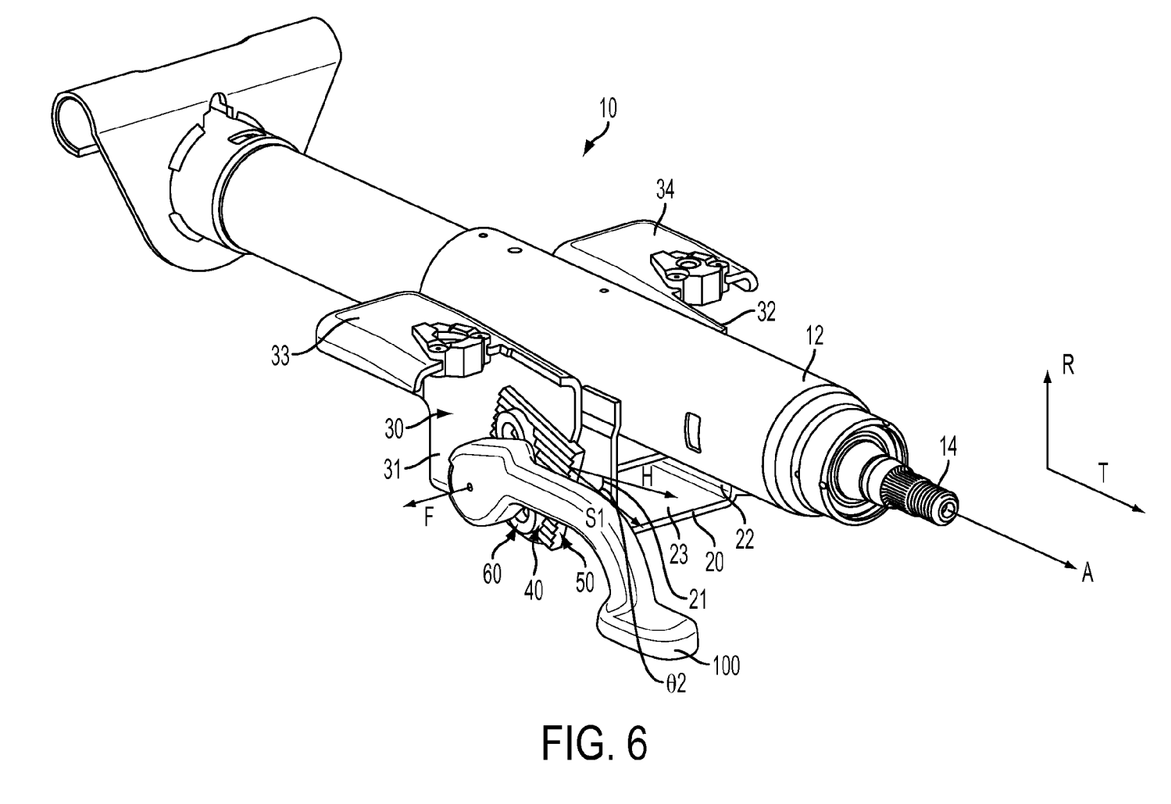
FIG. 6 is a perspective view of an adjustable steering column with a lock according to an exemplary embodiment of the present invention.
Figure 9:
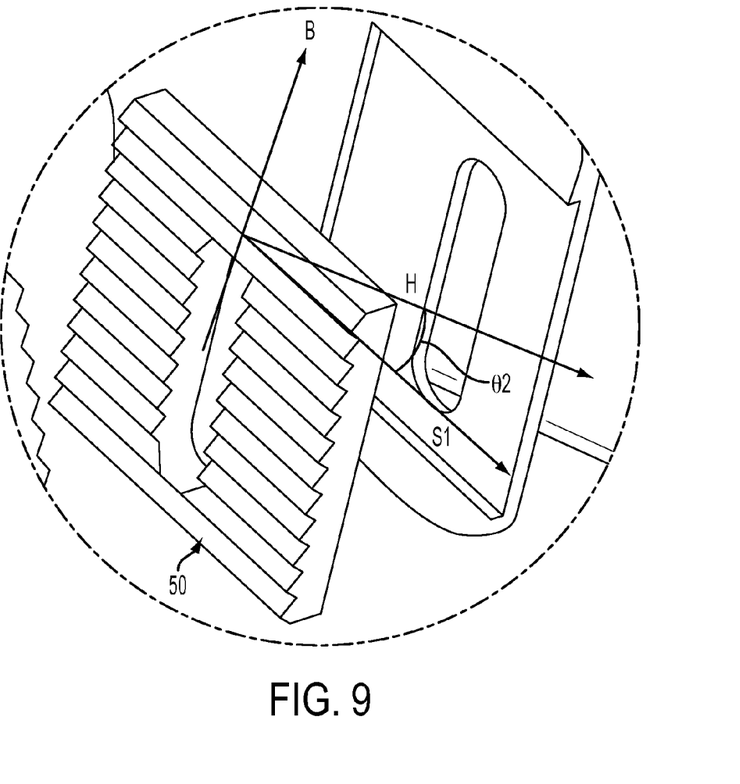
FIG. 9 is a view of the lock plate shown in FIG. 7 according to an exemplary embodiment of the present invention.

While FIG. 3 shows the first sliding direction 'S1' extending generally in a horizontal direction 'H', it is understood that the lock plate 50 may be tilted, or the rake lock teeth 52 may be angled differently so that the sliding direction extends at an angle relative to the horizontal 'H'. For example, FIGS. 6, 7 and 9 illustrate an exemplary embodiment where the lock plate 50 is secured to the mounting bracket 30 such that the first sliding direction 'S1' extends at angle θ2 relative to the horizontal 'H'. Further, in an exemplary embodiment, as shown in FIGS. 2 and 6, the second axis 'B' of the rake plate slot 36 may extend generally perpendicular to the first sliding direction 'S1'. However, the present invention is not limited to such a configuration.

Figure 8:
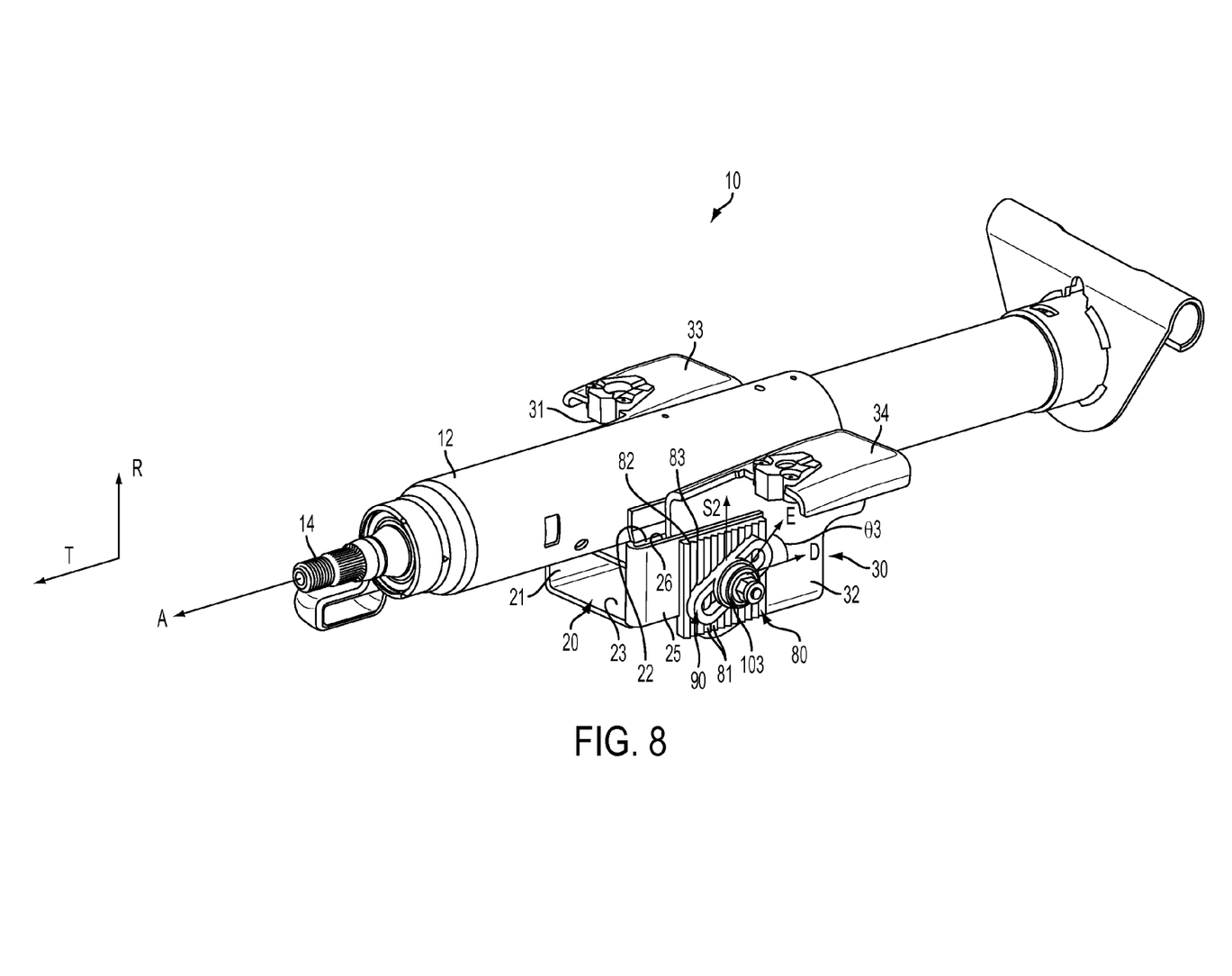
FIG. 8 is a perspective view of an adjustable steering column with a lock according to an exemplary embodiment of the present invention.

As noted above, exemplary embodiments of the present invention provide for the rake lock 40 to include a rake lock positioned on one side of the steering column, or for multiple rake locks 40 to be positioned on opposite sides of the steering column 10, for example, as shown in FIG. 2. The present invention may further include a telescope lock 70. With reference to FIGS. 7 and 8, the adjustable steering column 10 may include a rake lock 40 positioned at one side of the steering column and a telescope lock 70 positioned at the other side of the steering column.

With reference to FIGS. 7 and 8, the telescope lock 70 may be formed similarly to the rake lock 40, but rotated approximately 90° in one direction. For example, with reference to FIG. 8, the telescope lock 70 generally includes a telescope lock plate 80 and a telescope slider 90. The telescope lock plate 80 includes a plurality of telescope lock teeth 81 extending in a second sliding direction 'S2'. The telescope lock teeth 81 are formed as a plurality of peaks 82 having a plurality of valleys 83 formed therebetween. The telescope lock teeth 81 may be generally triangular in cross section. However, it is understood that the telescope lock teeth 81 of the present invention are not limited to a triangular cross-sectional shape and that other suitable cross-sectional shapes are envisioned.

The telescope lock plate 80 also includes a telescope slot 84 extending generally along fourth axis 'D'. In an exemplary embodiment, the fourth axis 'D' may be perpendicular to the second sliding direction 'S2'. The telescope slot 84 extends through the telescope lock plate 80. The telescope slot 84 includes a first end 85 and a second end 86 which generally define the limits for adjustment of the steering column 10 in the telescope direction 'T'.

The telescope slider 90 is selectively and reciprocally movable relative to the telescope lock plate 80 in the second sliding direction 'S2'. In an exemplary embodiment the telescope slider 80 may be formed generally the same as the rake slider 60 described above. In particular, the telescope slider 90 may be oblong in shape and extend along a fifth axis 'E'. A telescope slider slot 91 is formed in the telescope slider 90 and also extends along the fifth axis 'E'.

The telescope slider 90 includes a plurality of telescope slider teeth 92 configured to project into the valleys 83 between the projections 82 of the telescope lock teeth 81, such that the telescope slider teeth 92 lockingly engage the telescope teeth 81. Thus, the telescope slider teeth 92 extend generally along the second sliding direction 'S2'.

With reference to FIGS. 7 and 8, the telescope slider 90 is configured to be positioned relative to the telescope lock plate 80 such that the fifth axis 'E' of the telescope slider 90 is angled relative to the fourth axis 'D' of the telescope slider slot 91 at a non-zero third angle 'θ3'. In an exemplary embodiment, the third angle θ3 may be in the range of 30° to 50°. It is understood, however, that θ3 may be any non-zero angle. Accordingly, the telescope slider teeth 92 of the telescope slider 90, which extend in the second sliding direction 'S2', may extend at an angle relative to the fifth axis 'E'.

Similar to the exemplary embodiment of the rake slider teeth 67 shown in FIG. 5, the telescope slider teeth 92 are generally triangular in cross section. The telescope slider teeth 92 may include a plurality of peaks 93 having a plurality of valleys 94 formed therebetween. The telescope slider teeth 92 may be shaped differently than the telescope lock teeth 81. For example, the telescope slider teeth 92 may extend outwardly from telescope slider 90 at a different angle than the telescope lock teeth 81 extend from the telescope lock plate 80, or have different shapes or dimensions than the telescope lock teeth 81. Accordingly, the telescope slider teeth 92 may be shaped and configured to bite into the telescope lock teeth 81 when the telescope slider 90 is pressed into engagement with the telescope lock plate 80 as further described below. It is understood that the present invention is not limited to the cross-sectional shape described above and that other suitable cross-sectional shapes of the telescope slider teeth 92 are envisioned.

Further, with reference to FIG. 8, in an exemplary embodiment including a telescope lock 70, the compression bracket 20 includes a third side flange 25. The third side flange 25 is connected to the second side flange 22 at one end and extends generally parallel to the second side flange 22. The third side flange also includes the first slot 24. The size and shape of the first slot 24 on the third side flange 25 generally corresponds to the size and shape of the first slot 24 positioned on the first side flange 21 and second side flange 22.

In addition, the first slot 24 of the third side flange generally corresponds to the size, shape and position of the telescope slot 84 of the telescope lock plate 80. That is, in an exemplary embodiment, the first slot 24 positioned on the third side flange 25 has approximately the same shape and dimensions as the telescope slot 84 of the telescope lock plate 80, and is positioned to be oriented in the same direction as the telescope slot 84 such that the first slot 24 and the telescope slot 84 are aligned. The third side flange 25 is spaced from the second side flange 22 by a gap 26. The second wall 32 of the mounting bracket 30 may be received in the gap 26. The telescope lock plate 80 is secured to the third side flange 25 so that it moves with the third side flange 25 and the compression bracket 20 during movement of the compression bracket in the rake direction 'R' and the telescope direction 'T'.

Referring to FIGS. 1, 6 and 7, the adjustable steering column 10 further includes a locking lever 100. The locking lever 100 is rotatably mounted to the adjustable steering column 10 and is configured to actuate the rake lock 40 and telescope lock 70 between a locked condition where adjustment of the steering column 10 is limited and an unlocked condition where adjustment of the steering column 10 is permitted. The locking lever 100 is rotatable about a sixth axis 'F'.

The locking lever 100 is configured to rotate between a first position corresponding to the unlocked condition of the rake lock 40 and telescope lock 70 and a second position corresponding to the locked condition of the rake lock 40 and telescope lock 70. With reference to FIGS. 2, 3 and 7, the locking lever 100 is connected to the lock bolt 101. The lock bolt 101 extends along, and is rotatable about the sixth axis 'F'. The lock bolt 101 rotates together with the locking lever 100. The lock bolt 101 extends through the rake slider slot 64, the rake slot 55, the second slot 35 on the first and second walls 31, 32 of the mounting bracket 30, and the first slot 24 on the first and second side flanges 21, 22 of the compression bracket 20. In an embodiment including the telescope lock 70, the lock bolt 101 also extends through the first slot 24 on the third side flange 25, the telescope slot 84 of the telescope lock plate 80 and the telescope slider slot 91 of the telescope slider 90.

In an exemplary embodiment, a cam mechanism 110 is positioned on the lock bolt 101 between the rake slider 60 and the locking lever 100. The cam mechanism 110 may be any suitable cam mechanism whereby rotation of the locking lever 100 causes one part of the cam mechanism 110 to move axially along the sixth axis 'F' to apply or release a compressive force to the rake slider 60. In an exemplary embodiment, the cam mechanism 110 includes opposed ears 111 (FIG. 7) configured to engage an outer edges of the rake slider 60 so as to maintain orientation of the cam mechanism 110 relative to the rake slider 60.

The cam mechanism 110 may include a first part 112 and a second part 114 mounted on the lock bolt 101, with the lock bolt 101 extending therethrough. The first part 112 may be rotatable with the locking lever 100 and lock bolt 101 and the second part 114 may be movable along the sixth axis 'F' on the lock bolt 101 to apply or release the compressing force to rake slider 60 in response to rotation of the first part 112 of the cam mechanism 110. In an exemplary embodiment, the first 112, along with one end of the lock bolt 101 are overmolded within a portion of the locking lever 100. It is understood that the first and second cam parts 112, 114 may be reversed in orientation so long as one part rotates relative to another to cause relative axial movement.

In an exemplary embodiment, the first part 112 of the cam mechanism 110 may include at least one projection and at least one recess. The second part 114 may include a corresponding projection and recess. The projections and recesses of the respective first part 112 and/or second part 114 may be connected to each other by a ramp. In a first position, the projection of the first part 112 is received in the recess of the second part 114, and the projection of the second part 114 is received in the recess of the first part. Rotation of one part relative to the other causes the respective projections to move along the respective ramps and out of the recess. In a second position, the projection of the first part 112 is in contact with the projection of the second part 114. Compared to the first position, one part moves axially away from the other part due to the projection-to-projection contact between the cam parts.

Alternatively, the cam mechanism 110 may be a pin type cam, where at least one pin is disposed in respective recesses of the first part 112 and second part 114. In a first position, the pin is angled relative to the sixth axis 'F', thereby reducing or minimizing an axial distance between the first part 112 and second part 114. Rotation of one part relative to the other causes the pin to move within the respective recesses to a position that is generally parallel with the sixth axis 'F'. During this movement, the pin pushes one of the first part and second part axially away from the other of the first part 112 and second part 114.

In the examples above, the first position of the cam mechanism 110 corresponds to a position where a compressive force is released, or reduced, from the rake slider 60. The second position of the cam mechanism 110 corresponds to a position where a compressive force is applied to the rake slider 60.

A retaining mechanism 103 may be positioned on an opposite end of the lock bolt 101 from the locking lever 100. The retaining mechanism 103 serves to limit axial movement along the lock bolt 101. Thus, when the cam mechanism 110 is in the second position, a compressive force is applied to all components along the lock bolt 101. In the first position of the cam mechanism 110, the compressive force is reduced or removed from the various components.

In operation, with the rake lock 40 and telescope lock 70 in a locked condition, the locking lever 100 is in the second position. The cam mechanism 110 is also in a second position where a compressive force is applied to the rake lock slider 60, and in turn, all of the components positioned on the lock bolt 101 between the cam mechanism 110 and the retaining mechanism 103.

In the locked condition, the peaks 68 of the rake slider teeth 67 are positioned in the valleys 54 of the rake lock teeth 52 of the rake lock plate 50. The compressive force applied from the cam mechanism 110 to the rake lock slider 60 results in a friction force between the teeth 67 of the rake slider 60 and the rake lock plate 50 that acts against movement of the rake slider 60 in the first sliding direction 'S'. In addition, the compressive force may elastically deform or deflect the rake slider 60 so that the rake slider teeth 67 bite into the rake lock teeth 52 of the rake lock plate 50, further acting against movement of the rake slider 60 in the first sliding direction 'S1' relative to the rake lock plate 50.

Similarly, due to the compressive force applied the components positioned along the lock bolt 101, the peaks 93 of the telescope slider teeth 92 are engaged in the valleys 83 of the telescope lock teeth 81, resulting in a friction force therebetween that resists movement of the telescope slider 90 relative to the telescope lock plate 80 in the second sliding direction 'S2'. In addition, the compressive force applied to the components may elastically deform or deflect the telescope slider 90 so that the telescope slider teeth 92 bite in into the telescope lock teeth 81 of the telescope lock plate 80, thereby further resisting movement of the telescope slider 90 relative to the telescope lock plate 80 in the second sliding direction 'S2'.

With reference to FIG. 3, with the rake lock 40 in the locked condition, the cam mechanism 110 is in the second position and a compressive force is applied to the rake slider 60. An attempt to adjust the steering column 10 in the rake direction 'R' causes the lock bolt 101 to apply a first adjustment force 'AF1' to the rake slider 60. In the example shown in FIG. 3, with the lock bolt 101 at the first end 56 of the rake slot 55 and in the rake slider slot 64 adjacent to the first end 61 of the rake slider 60, an attempt to adjust the steering column 10 in the rake direction 'R' causes a downward first adjustment force 'AF1' on the lock bolt 101. The first adjustment force 'AF1' is transferred to the rake slider 60 through the rake slider slot 64. Due to the angled arrangement of the rake slider 60 and rake slider slot 64 relative to the rake lock plate 50 and rake slot 55, the rake slider 60 is urged in the first sliding direction 'S1'. However, as detailed above, the rake slider 60 resists movement in the first sliding direction 'S1' due to a frictional engagement between the rake slider 60 and the rake lock plate 50 and a biting engagement between the rake slider teeth 67 and the rake lock teeth 52. Because the movement of the rake slider 24 in the first sliding direction 'S1' is limited or prevented, the lock bolt 101 is held against movement the rake slot 55 and rake slider slot 64. Thus, adjustment of the steering column 10 in the rake direction is limited or prevented with the rake lock 40 in the locked condition. It is understood that the first adjustment force 'AF1' may be in an upward or downward direction with respect to FIG. 3 depending on the desired direction of adjustment.

An attempt to adjust the steering column 10 in the telescope direction 'T' results in a second adjustment force 'AF2' applied to the column jacket 12, steering shaft 14 and compressing bracket 20. The second adjustment force 'AF2' urges the telescope lock plate 80, which is secured to the compression bracket 20, in the telescope direction 'T' relative to lock bolt 101. The telescope slot 84 accommodates movement of the telescope lock plate 80 relative to the lock bolt 101. However, the lock bolt 101 contacts the telescope slider 90 within the telescope slider slot 91. Because the telescope slider 90 is restricted against movement in the second sliding direction 'S2' and in the direction of the fourth axis 'D' relative to the telescope lock plate 80, movement of the telescope lock plate 80, the compression bracket 20, column jacket 12 and steering column 14 in the telescope direction is limited or prevented.

To adjust the steering column 10, a user rotates the locking lever 100 in a predetermined direction from the second position to the first position. Rotation of the locking lever 100 toward the first position operates the cam mechanism 110 so that the first cam part 112 rotates relative to the second cam part 114. The first and second cam parts 112, 114 move axially toward each other, thereby releasing the compressive force applied to the rake lock slider 60 and the other components positioned along the lock bolt 101 between the cam mechanism 110 and retaining mechanism 103.

Due to the reduced or released compressive force applied from the cam mechanism 110, the friction between the rake slider 60 and the rake lock plate 50 may be reduced. In addition, the rake slider teeth 67 of the rake slider 60 may be moved out of biting engagement with the rake lock teeth 52 of the rake lock plate 50. If the rake slider 60 was elastically deflected or deformed due to application of the compressive force, the rake slider 60 may return to its original undeflected or undeformed state. Thus, the rake slider 60 moves out of the frictional and biting engagement with rake lock plate 50. However, the rake slider 60 does not completely disengage the rake lock plate 50. Rather, reducing or releasing the compressive force allows the rake slider 60 to move along sixth axis 'F' away from the rake lock plate 50 to move out of frictional and biting engagement with the lock plate. The rake slider teeth 67 remain positioned between the rake lock teeth 52 of the rake lock plate 50. That is, even in the unlocked condition, the peaks 68 of the rake slider teeth 67 still project into the valleys 54 of the rake lock teeth 52.

However, due the reduced of friction between the rake slider 60 and rake lock plate 50 and the disengagement of the biting relationship between the rake lock teeth 52 and rake slider teeth 67, the rake slider 60 may move relative to the rake lock plate 50 in the first sliding direction 'S1'. For example, with reference to FIG. 3, with the rake lock 40 in the unlocked condition, the adjustment force 'AF1' may be downwardly applied to the lock bolt 101. The adjustment force 'AF1' is transferred to the rake slider 60. Due to the angled relationship between the rake slider 60 and the rake slot 55 of the rake lock plate 50, the downward adjustment force causes the rake slider 60 to move in the first sliding direction 'S1' (right to left in FIG. 3) while the lock bolt 101 moves downward in the rake slot 55. Similarly, an upward adjustment force 'AF1' would cause the rake slider 60 to slide in an opposite direction (i.e., left to right in FIG. 3) relative to the rake lock plate 50. Accordingly, the steering column 10 may be adjusted in the rake direction 'R'.

During adjustment in the rake direction 'R', the column jacket 12, steering shaft 14 and compression bracket 20 may move in the rake direction 'R' relative to the mounting bracket 30. In addition, the lock bolt 101 may move in the rake direction 'R' within the second slot 35 in the first and second walls 31, 32 of the mounting bracket 30.

With reference to FIGS. 7 and 8, in an embodiment where the adjustable steering column includes the telescope lock 70 positioned oppositely from the rake lock 40, the telescope lock 70 is in the unlocked condition when the locking lever 100 and cam mechanism 110 are moved from respective second positions to respective first positions, thereby reducing or releasing the compressive force. Accordingly, the telescope slider 90 moves out of frictional and biting engagement with the telescope lock plate 80. Similar to the rake lock 40, the telescope slider 90 does not completely disengage the telescope lock plate 80. Rather, reducing or releasing the compressive force allows for movement of the telescope slider 90 relative to the telescope lock plate 80 along sixth axis 'F' away from the telescope lock plate 80 to move out of frictional and biting engagement with the telescope lock plate 80. The telescope slider teeth 92 remain positioned between the telescope lock teeth 81 of the telescope lock plate 80. That is, even in the unlocked condition, the peaks 93 of the telescope slider teeth 92 still project into the valleys 83 of the telescope lock teeth 81, such that relative movement between the telescope slider 90 and the telescope lock plate 80 in the direction of fourth axis 'D' is still substantially restricted.

To adjust the steering column 10 in the telescope direction 'T', the second adjustment force 'AF2' is applied to the steering column. The second adjustment force causes the column jacket 12, steering shaft 14, compression bracket 20 and telescope lock to move in the telescope direction 'T'. The lock bolt 101 is restricted from movement in the telescope direction 'T' due to its engagement in the second slot 35 of the mounting bracket 30. During movement of the telescope lock plate 80 relative to the lock bolt 101, the lock bolt acts against the telescope slider 90. Due to the angled relationship between the telescope slider 90 and the telescope lock plate 80, movement of the telescope lock plate in one direction causes the telescope slider to move in the second sliding direction 'S2' relative to the telescope lock plate. Movement of the telescope lock plate 80 in an opposite direction, e.g., during adjustment of the steering column in an opposite direction, causes the telescope slider 90 to slide in the opposite direction relative to the telescope lock plate 80.

Once a desired rake position of the steering column 10 is reached, the locking lever 100 may be rotated back to the second, locked position to maintain the adjustable steering column 10 in the desired rake and telescope positions. Rotation of the locking lever 100 from the first position to the second position causes the cam mechanism 110 to operate such that the second part moves axially away from the first part in the direction of the sixth axis 'F' along the lock bolt 101. This axial movement causes the second cam part to apply the compressive force to the rake slider 60 and the other components along the lock bolt 101 between the cam mechanism 110 and retaining mechanism 103. Accordingly, the rake slider 60 is urged into frictional and biting engagement with the rake lock plate 50 and the telescope slider 90 is urged into frictional and biting engagement with the telescope lock plate 80.

In the exemplary embodiments above, peak-to-peak contact between the respective peaks of the rake slider teeth 67 and rake lock teeth 52 when moving from the unlocked condition to the locked condition is avoided because the respective peaks of the rake slider teeth 67 and rake lock teeth 52 are not completely disengaged, i.e., spaced apart in a direction motion, when moving between the unlocked and locked conditions. That is, the peaks 68 of the rake slider teeth 67 remain at least partially projected in the respective valleys 54 of the between the peaks 53 of the rake lock teeth 52. Similarly, peak-to-peak contact between the telescope slider teeth 92 and telescope lock teeth 81 may be avoided as well.

In addition, the exemplary embodiments above provide for an infinite number of positions in the rake direction where the steering column 10 may be positioned. This is because the locking of the rake lock 40 and telescope lock 70 is not dependent on the engagement and disengagement of a limited number of teeth in a direction of adjustment. Rather, the adjustable steering column according to an exemplary embodiment of the present invention may be locked at any position along the rake slot 55 of the rake lock plate 50 and the telescope slot 84 of the telescope lock plate 80.

The holding capacity of the rake lock 40 may be provided by both a frictional engagement between the rake slider 60 and the rake lock plate 50 together with the biting engagement between the rake slider teeth 67 and the rake lock teeth 52 in the locked condition. The holding capacity may be adjusted for various platforms by adjusting the first angle θ1 between the rake slider 60 and the rake slot 55 of the rake lock plate 50. For example, the holding strength may be increased by increasing the first angle θ1. It is understood that the orientation of the rake slider teeth 67 may be adjusted based on the first angle θ1 so that the rake slider teeth 67 still extend in the first sliding direction 'S1'. Likewise, the holding capacity of the telescope lock 70 may be adjusted for various platforms by adjusting the third angle θ3 between the telescope slider 90 and the telescope slot 84.

It is understood that an adjustable steering column may include either at least one rake lock, at least one telescope lock, or a rake lock and telescope lock. Accordingly, the locking lever 100 may actuate only a rake lock, telescope lock, or both, depending on the particular locks included in the steering column. The rake or telescope lock may be positioned on either side of the column jacket. Thus, the compressive force may be applied to a rake or telescope lock either directly by the cam mechanism or via other components positioned along the lock bolt 101.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A lock for an adjustable steering column configured to lock the adjustable steering column against adjustment in a rake or telescope direction, the lock comprising:
   a rotatable locking lever configured to actuate the lock between an unlocked position and a locked position;
   a lock plate configured to be secured to the adjustable steering column and comprising a plurality of plate lock teeth extending in a sliding direction and a first slot extending along a first axis;
   a slider comprising a plurality of slider lock teeth extending in the sliding direction, the slider teeth configured to be received between respective plate lock teeth, and a second slot extending along a second axis, the second axis angled relative to the first axis;

a lock bolt, rotatable with the locking lever, extending through the first slot and second slot, the lock bolt having a retaining mechanism fastened on one end thereof; and a cam positioned on the lock bolt configured to apply or release a compressive force to the slider in response to rotation of the locking lever, such that in the locked position the compressive force is applied to the slider and the slider lock teeth lockingly engage between the plate lock teeth thereby securing the slider against movement in the sliding direction relative to the lock plate, and in the unlocked position, the compressive force is released from the slider and the slider lock teeth are released from locking engagement with and positioned between the plate lock teeth thereby allowing the slider to move relative to the lock plate in the sliding direction.

2. The lock as set forth in claim 1, wherein the lock plate is a rake lock plate, the first slot extends in a rake direction, and the slider is a rake slider, and in the locked position, the rake lock plate and rake slider secure the adjustable steering column against adjustment in the rake direction, and in the unlocked position the rake slider is movable in the sliding direction relative to the rake lock plate to allow for adjustment of the steering column in the rake direction.

3. The lock as set forth in claim 2, wherein the rake slider is movable relative to the rake lock plate in the sliding direction in response to movement of the lock bolt in the first slot.

4. The lock as set forth in claim 1, wherein the lock plate is a telescope lock plate, the first slot extends in a telescope direction, and the slider is a telescope slider, and in the locked position, the telescope lock plate and telescope slider secure the adjustable steering column against adjustment in the telescope direction, and in the unlocked position the telescope slider is movable relative to the telescope lock plate in the sliding direction to allow for adjustment of the steering column in the telescope direction.

5. The lock as set forth in claim 4, wherein the telescope slider is movable relative to the telescope lock plate in the sliding direction in response to movement of the telescope lock plate in the telescope direction relative to the lock bolt such that the lock bolt acts against the telescope slider in the second slot.

6. The lock as set forth in claim 1, wherein the slider lock teeth lockingly engage the plate lock teeth by frictionally engaging the plate lock teeth.

7. The lock as set forth in claim 6, wherein the slider lock teeth lockingly engage the plate lock teeth by biting into the plate lock teeth.

8. The lock as set forth in claim 7, where in the compressive force applied to the slider elastically deforms the slider so that the slider lock teeth bite into the plate lock teeth.

9. The lock as set forth in claim 7, wherein the slider lock teeth are shaped differently than respective valleys between the plate lock teeth such that the compressive force applied to the slider causes the slider lock teeth to bite into the plate lock teeth.

10. The lock as set forth in claim 1, where in the first axis is perpendicular to the sliding direction.

11. An adjustable steering column assembly for a vehicle, the assembly comprising:
a steering shaft extending along a first axis;
a column jacket surrounding the steering a shaft;
a compression bracket fixed to the column jacket, the compression bracket comprising a first side flange and a second side flange connected by a body portion and positioned on opposite sides of the column jacket, each of the first side flange and second side flange having a first slot formed therein;

a mounting bracket secured to an adjacent portion of the vehicle, the mounting bracket comprising a first wall positioned adjacent to the first side flange and a second wall positioned adjacent to the second side flange, each of the first wall and second wall including a second slot formed therein; and a lock actuatable between a locked position where adjustment of the steering column is prevented and an unlocked position where adjustment of the steering column is allowed, the lock comprising:
a rotatable locking lever configured to actuate the lock between an unlocked position and locked position;

a lock plate secured to one of the compression bracket and mounting bracket, the lock plate comprising a plurality of plate lock teeth extending in a sliding direction and a plate slot extending along a second axis;

a slider comprising a plurality of slider lock teeth extending in the sliding direction, the slider lock teeth configured to be received between respective plate lock teeth, and a slider slot extending along a third axis, the third axis angled relative to the second axis;

a lock bolt, rotatable with the locking lever, extending through the plate slot, slider slot, second slot in the first and second walls, and first slot in the first and second side flanges, the lock bolt including a retaining mechanism positioned on one end thereof; and a cam positioned on the lock bolt configured to apply or release a compressive force to the slider in response to rotation of the locking lever, such that in the locked position the compressive force is applied to the slider and the slider lock teeth are lockingly engaged between the plate lock teeth thereby securing the slider against movement in the sliding direction relative to the lock plate, and in the unlocked position, the compressive force is released from the slider and the slider lock teeth are released from locking engagement with and positioned between the plate lock teeth thereby allowing the slider to move relative to the lock plate in the sliding direction.

12. The assembly as set forth in claim 11, wherein the lock is a rake lock, the plate slot and the second slot of the mounting bracket extend in a rake direction, and the lock plate is secured to the mounting bracket; and in the locked position, the lock plate and the slider secure the adjustable steering column against adjustment in the rake direction, and in the unlocked position, the slider is movable relative to the lock plate in the sliding direction to allow for adjustment of the steering column in the rake direction.

13. The assembly as set forth in claim 12, wherein the slider is movable relative to the lock plate in the sliding direction in response to movement of the lock bolt in the plate slot.

14. The assembly of claim 13, wherein the compression bracket further comprises a third side flange connected to the second side flange and extending parallel thereto, the first slot formed in the third side flange, the first slot of the first, second and third side flanges extending in a telescope direction; and the assembly further comprises a telescope lock, the telescope lock comprising:
a telescope lock plate secured to the third flange of the compression bracket, the telescope lock plate comprising a plurality of telescope lock teeth extending in a second sliding direction and a telescope slot extending along a fourth axis in the telescope direction;

a telescope slider comprising a plurality of telescope slider lock teeth extending in the second sliding direction, the telescope slider lock teeth configured to be received between respective telescope lock teeth, and a telescope slider slot extending along a fifth axis, the fifth axis angled relative to the fourth axis; and the lock bolt extends through the first slot of the third side flange, the telescope slot and the telescope slider slot, the telescope lock is in the locked position when the cam applies the compressive force such that telescope slider lock teeth are lockingly engaged between the telescope lock teeth thereby securing the telescope slider against movement in the second sliding direction relative to the telescope lock plate, and the telescope lock is in the unlocked position when the cam releases the compressive force such that the telescope slider lock teeth are released from locking engagement with and positioned between the telescope lock teeth thereby allowing the telescope slider to move relative to the telescope lock plate in the second sliding direction.

15. The assembly as set forth claim 14, wherein upon application of an adjustment force in the telescope direction, with the telescope lock in the unlocked position, the compression bracket and the telescope lock move together in the telescope direction relative to the lock bolt, and the lock bolt acts against the telescope slider in the telescope slider slot to move the telescope slider in the second sliding direction relative to the telescope lock plate.

16. The assembly as set forth in claim 15, wherein rotation of the locking lever between the first and second positions actuates the rake lock and the telescope lock.

17. The assembly as set forth in claim 11, wherein the lock is a telescope lock, the plate slot and the first slot of the compression bracket extend in a telescope direction, and the lock plate is secured to the compression bracket; and in the locked position, the lock plate and the slider secure the adjustable steering column against adjustment in a telescope direction, and in the unlocked position, the slider is movable relative to the lock plate in the sliding direction to allow for adjustment of the steering column in the telescope direction.

18. The assembly as set forth in claim 11, wherein the slider lock teeth lockingly engage the plate lock teeth by frictionally engaging the plate lock teeth.

19. The assembly as set forth in claim 18, wherein the slider lock teeth lockingly engage the plate lock teeth by biting into the plate lock teeth in response to application of the compressive force.

20. The assembly as set forth in claim 11, wherein the second axis is perpendicular to the sliding direction.

* * * * *